United States Patent Office 3,703,557
Patented Nov. 21, 1972

3,703,557
PROCESS FOR THE PREPARATION OF TETRA-FLUOROETHYLENE BY DECHLORINATION AND DIMERIZATION OF DICHLORODIFLUOROMETHANE
Martino Vecchio, Milan, Giorgi Carraro, Saronno, and Italo Cammarata, Milan, Italy, assignors to Montecatini Edison S.p.A., Milan, Italy
No Drawing. Filed June 4, 1970, Ser. No. 43,578
Claims priority, application Italy, June 4, 1969, 17,737/69
Int. Cl. C07c 21/18, 17/26
U.S. Cl. 260—653.3
12 Claims

ABSTRACT OF THE DISCLOSURE

A process is disclosed for the preparation of tetrafluoroethylene by the dechlorination and dimerization of dichlorodifluoromethane, wherein the reaction is carried out with an amalgam of alkali or alkaline-earth metal in a reaction medium comprising at least one organic solvent.

---

The present invention relates to a process for the preparation of tetrafluoroethylene by the simultaneous dechlorination and dimerization of dichlorodifluoromethane.

As is well known, tetrafluoroethylene represents an important raw material having many and considerable application possibilities, mainly in the field of plastics where tetrafluoroethylene polymers offer highly interesting chemical and physical characteristics.

Tetrafluoroethylene is generally obtained by pyrolysis of $CHClF_2$. The pyrolysis reaction must be carried out at very high temperatures (at from 700° to 800° C.) in platinum tubes. This process presents considerable complications and difficulties which, from the practical and economic point of view, reduce its actual industrial interest. In fact, the pyrolysis process does not allow one to attain sufficiently high conversions, a factor which is closely related to the yields and, thus, to the economic convenience of the process.

Moreover, the necessary high temperatures cause the formation of by-products difficult to separate from the tetrafluoroethylene product wherein they remain as impurities in quantities which, although small by themselves, are nevertheless intolerable, as is well known to those skilled in the art, in the subsequent employment of the tetrafluorothylene such as for polymerization.

Thus, further expensive purification operations become necessary which are made more difficult by reason of the presence of large quantities of hydrochloric acid generated in the pyroreaction.

Therefore one object of the present invention is to provide a simple and cheap process for the preparation of tetrafluoroethylene which is free of the cited drawbacks of the prior art.

Another object is that of providing a process for the preparation of tetrafluoroethylene wherein a cheap and readily available raw material may be used as starting material.

These and still other objects, which will appear more fully from the following description, are achieved according to this invention by a process for the preparation of tetrafluoroethylene by the dechlorination and dimerization of dichlorodifluoromethane, wherein the reaction is carried out by means of an amalgam of an alkali or of an alkaline-earth metal in at least one aprotic polar organic solvent, and preferably in the presence, as a promoter, of at least one salt selected from the group consisting of "onium" salts and lithium salts.

Suitable solvents consist of substances or mixtures thereof which are resistant to the reducing action of the alkali or alkaline-earth metal amalgam.

Particularly advantageous as the solvents are compounds or mixtures of compounds selected from the group consisting of hydrocarbons, substituted acyclic amides, saturated nitriles, simple or substituted lactams, sulphones, sulphoxides, ethers, phosphoric esters, and alkyl carbonates.

As specific examples of suitable solvents there may be mentioned: hydrocarbons such as benzene, toluene, isooctane, n-octane, n-heptane, petroleum ether, hexane, cyclohexane, decahydronaphthalin and the like; substituted acyclic amides such as: N-dimethylformamide, N-methyl-acetamide, hexamethylphosphotriamide and the like; lactams such as: pyrrolidone, N-methyl-pyrrolidone, N-cyclohexyl-pyrrolidone, ethylene-bis-pyrrolidone, valerolactam, caprolactam, ethyl-caprolactam and the like; nitriles such as: acetonitrile, propionitrile, benzonitrile and the like; sulphones and sulphoxides such as: dimethyl-sulphoxide, sulpholane, sulphonal, diphenyl-sulphoxide, diphenyl-sulphone, and the like; ethers such as: methylethylether, diethyl-ether, methyl n-propylether, methylisopropylether, trimethylene-glycoldimethyl-ether, dioxane, ethylene-glycolmonomethylether-acetate, tetrahydrofurane and the like; organic carbonates such as: diethyl carbonate, propylene carbonate and the like; and phosphoric esters such as: trimethylphosphate, triethylphosphate, trinormal-butylphosphate, dimethyl-normal-butylphosphate, methyldiethylphosphate.

Effective promoters consist of "onium" salts or lithium salts such as lithium chloride. Said promoters are used in quantities varying from 0.001 to 20 parts by weight per 100 parts of solvent.

Particularly suited for use as promoters are "onium" salts of the type:

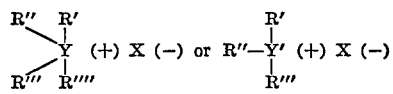

wherein:

Y is nitrogen or phosphorus, and
Y' is oxygen or sulphur, and
R', R", R''' and R'''', equal or different from each other, may be alkyl, aryl, alkyl-aryl, aryl-alkyl or cycloalkyl radicals, which may contain one or more hetero-atoms such as nitrogen, oxygen and sulphur; and
X is a halogen anion such as: fluoride, chloride, bromide and iodide, an $SO_4^{--}$, $CNS^-$, $CNO^-$ group, the anion of an organic sulphonic acid or the anion of a carboxylic acid and similar anions of acids not reduceable by the amalgam under the reaction conditions.

Just for purposes of exemplification, suitable promoters include p-toluene-sulphonate of tetramethylammonium, methyltributylammonium p-toluene-sulphonate, triethylmethylammonium p-toluenesulphonate, tetraethylammonium bromide, trimethylcetylammonium bromide, trimethyl-cyclopentylammonium bromide, trimethylethylammonium chloride, di-stearyl-dimethylammonium chloride, trimethyl(p-tolyl)ammonium iodide, N-dimethylmorpholine iodide, tetramethylammonium alpha- or betanaphthalene-sulphonate, benzyltriethylammonium phosphate, benzyl-trimethylammonium thiocyanate, N-methyl-N-ethylpiperidine iodide, tetra-butylammonium fluoride, trimethyl-cyclohexylammonium acetate, tetramethyl-phosphonium iodide, and the like.

The process according to this invention is carried out at a temperature varying from −40° to 110° C. Particularly advantageous results are obtained when operating at temperatures between 0° C. and +80° C.

The pressure employed is between atmospheric pressure and 40 atm., but preferably is between atmospheric pressure and 10 atmospheres.

The process is carried out by using an amalgam of an alkali or alkaline-earth metal such as: sodium, potassium, rubidium, caesium, lithium, calcium, strontium and barium. The concentration of the active metal may vary within a rather wide range. Particularly favorable results are achieved with concentrations of the alkaline metal between 0.01% and 1%, and preferably between 0.05% and 0.5% by weight of the amalgam.

The process may be carried out either batchwise or in continuous operation.

According to a preferred embodiment of the invention, the process is carried out by feeding fresh amalgam coming for instance directly from an electrolytic cell, and the starting reactant to be dechlorinated (i.e., the dichlorodifluoromethane) into the reactor containing the aprotic polar organic solvent, and by then discharging the reaction product and the exhausted amalgam for recycling back to the electrolytic cell.

The reaction is exothermic and so the temperature is regulated both by means of a suitable metering of the amalgam as well as by a thermostatic bath.

Effecting a separation between the reactants and the reaction product—which may be according to methods known per se in the prior art—is made easier by the considerable difference in the boiling points, which allows e.g. a fractional distillation.

Finally, one may conveniently employ polymerization inhibitors suitable for hindering the extension of

—$CF_2$—$CF_2$— chains, such as for instance terpenes (limonene), phenol, quinones, etc. This is not a positive requirement, however, since it is easily possible to operate even in the absence of inhibitors. The process turns out to be particularly advantageous owing to the mild operational conditions.

Still another advantage, from the industrial and economics point of view, lies in the fact that simple and conventional apparatus may be used which is easy to maintain. A further advantage resides in the fact that, according to this invention, substantially pure tetrafluoroethylene is readily obtained with no really serious purification problems.

The present invention will now be illustrated in greater detail in the following examples which are given solely for illustrative purposes and not by way of limitation:

EXAMPLE 1

1.5 g. of tetraethylammonium-paratoluene-sulphonate were dissolved in 192 g. of N-N-dimethylformamide. Into this solution, kept under stirring, were dissolved 14.5 g. of $CF_2Cl_2$ under ambient pressure and at a temperature of 20° C., and thereafter there were introduced dropwise 1950 g. of sodium amalgam (0.129% by weight of Na). In this way there were obtained 0.098 mole of gas of the following composition:

| | Moles |
|---|---|
| $C_2F_4$ | 0.023 |
| $CH_2F_2$ | 0.001 |
| $CF_2Cl_2$ | 0.074 |
| | 0.098 |

| | Percent |
|---|---|
| Conversion yield of $CF_2Cl_2$ | 38.3 |
| Net yield of $C_2F_4$, based on converted $CF_2Cl_2$ | 98 |
| Net yield of $C_2F_4$, based on converted Na | 84.2 |

EXAMPLE 2

1.5 g. of tetraethylammonium-p-toluensulphonate and 0.7 g. of limonene were dissolved in 152 g. of propylene carbonate. Into this solution, kept under heavy or vigorous stirring, were introduced under ambient pressure and at 20° C., 15 g. of gaseous $CF_2Cl_2$ and 3825 g. of sodium amalgam (0.164% by weight of Na). There were thus obtained 0.064 moles of gaseous products containing:

| | Moles |
|---|---|
| $C_2F_4$ | 0.0110 |
| $CF_2Cl_2$ | 0.0480 |
| $C_2F_4Cl_2$ | 0.0025 |

| | Percent |
|---|---|
| Conversion yield of $CF_2Cl_2$ | 61.3 |
| Net yield of $C_2F_4$, based on converted $CF_2Cl_2$ | 29 |
| Net yield of $C_2F_4$, based on converted Na | 16.2 |

EXAMPLE 3

Into 158 g. of N-N-dimethylformamide were introduced, kept under heavy or vigorous stirring, under ambient pressure and at 45° C., 18 g. of gaseous $CF_2Cl_2$ corresponding to 0.15 mole, and 1854 g. of sodium amalgam (0.108% by weight of Na). There were thus obtained 0.134 moles of gaseous products of the following composition:

| | Moles |
|---|---|
| $C_2F_4$ | 0.018 |
| $CF_2Cl_2$ | 0.116 |
| $C_2F_4Cl_2$ | Traces |
| | 0.134 |

| | Percent |
|---|---|
| Conversion yield of $CF_2Cl_2$ | 22.7 |
| Net yield of $C_2F_4$, based on converted $CF_2Cl_2$ | 99 |
| Net yield of $C_2F_4$, based on converted Na | 83 |

What is claimed is:

1. A process for the preparation of tetrafluoroethylene by the dechlorination and dimerization of dichlorodifluoromethane, wherein the reaction is carried out with an amalgam of alkali or alkaline-earth metal,
   at a temperature between −40° and +110° C.,
   in a reaction medium comprising at least one aprotic polar organic solvent resistant to the reducing action of the amalgam, selected from the group consisting of substituted acyclic amides, saturated nitriles, simple or substituted lactams, sulphones, sulphoxides, ethers, phosphoric esters and alkyl carbonates.

2. A process according to claim 1, wherein the temperature lies between 0° and +80° C.

3. A process according to claim 1, wherein the process is carried out at a pressure between atmospheric pressure and 40 atmospheres.

4. A process according to claim 3, wherein the pressure lies between atmospheric pressure and 10 atmospheres.

5. A process according to claim 1, wherein the amalgam of the alkali or alkaline-earth metal consists of an amalgam of a metal selected from the class consisting of sodium, potassium, rubidium, cesium, lithium, calcium, strontium and barium.

6. A process according to claim 1, wherein the active metal concentration in the amalgam is between 0.01% and 1% parts by weight based on the total weight.

7. A process according to claim 6, wherein the active metal concentration is between 0.05% and 0.5% parts by weight based on the total weight.

8. A process according to claim 1, wherein a polymerization inhibiting substance is added to the reaction medium.

9. The process of claim 1 wherein the reaction is carried out in the presence of a promoting substance used in quantities varying from 0.001 to 20 parts with respect to 100 parts by weight of solvent and consisting of a compound of the general formula:

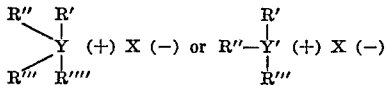

wherein:

Y is nitrogen or phosphorus,

Y' is oxygen or sulphur, and where

R', R", R''' and R'''', equal or different from each other, are alkyl, aryl, alkyl-aryl, aryl-alkyl or cycloalkyl radicals, and which may contain one or more hetero-atoms such as nitrogen, oxygen and sulphur; and X is a halogen anion, an $SO_4^{--}$, $CNS^-$, $CNO^-$ group or the anion of an organic sulphonic acid, the anion of a carboxylic acid or an anion of a non-reducible acid.

10. The process of claim 1 wherein the reaction is carried out in the presence of a promoting substance used in quantities varying from 0.001 to 20 parts with respect to 100 parts by weight of solvent and consisting of lithium chloride.

11. The process of claim 1 wherein said solvent is N-N-dimethylformamide.

12. The process of claim 1 wherein the promoter is tetraethylammonium-paratoluene-sulphonate.

References Cited
UNITED STATES PATENTS

| | | | |
|---|---|---|---|
| 2,737,533 | 3/1956 | Marks et al. | 210—653.3 |
| 3,016,405 | 1/1962 | Lovejoy | 260—653.3 |
| 3,367,983 | 2/1968 | Soulen et al. | 260—653.3 |

DANIEL D. HORWITZ, Primary Examiner